A. B. DAY.
MINING CAR WHEEL.
APPLICATION FILED NOV. 18, 1915.
1,173,179.
Patented Feb. 29, 1916.
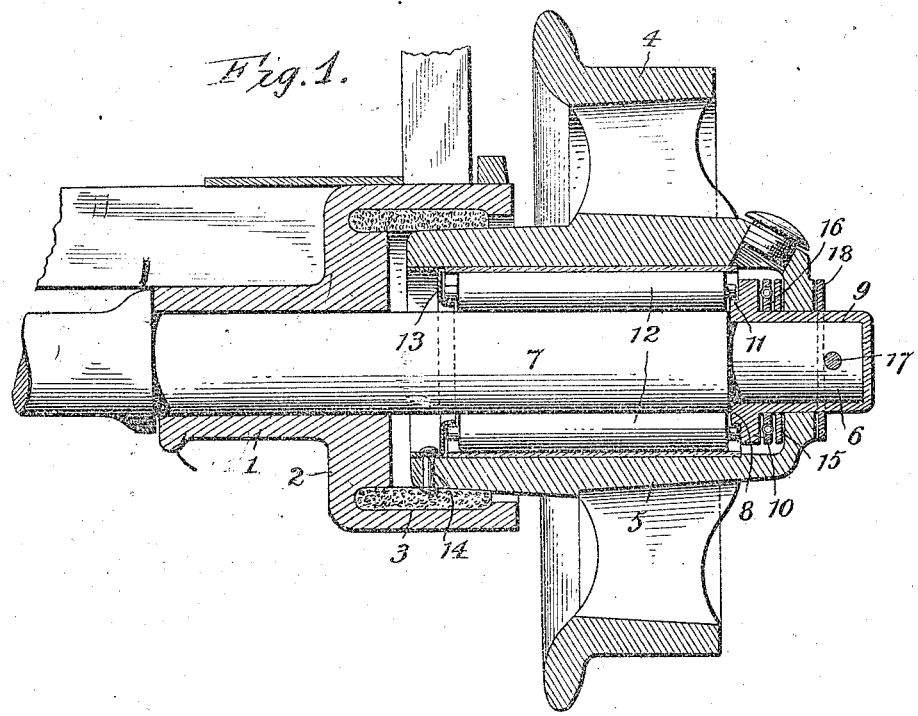
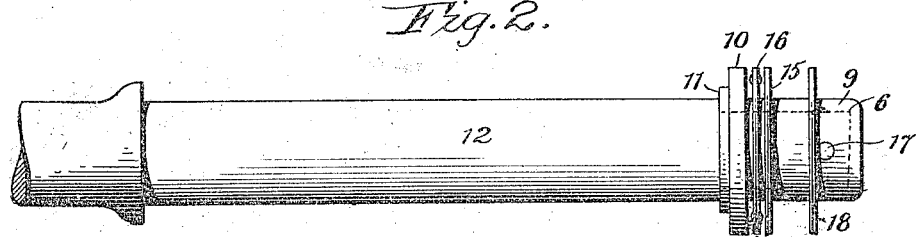
Witness:
Jas. E. Hutchinson.
Inventor:
Alfred Bryant Day,
By _____ Attorneys

UNITED STATES PATENT OFFICE.

ALFRED BRYANT DAY, OF KNOXVILLE, TENNESSEE.

MINING-CAR WHEEL.

1,173,179.  Specification of Letters Patent.  Patented Feb. 29, 1916.

Application filed November 18, 1915. Serial No. 62,173.

*To all whom it may concern:*

Be it known that I, ALFRED BRYANT DAY, a citizen of the United States, residing at Knoxville, in the county of Knox and State of Tennessee, have invented certain new and useful Improvements in Mining-Car Wheels, of which the following is a specification, reference being had therein to the accompanying drawing.

This invention relates to certain improvements in car wheels and more particularly to wheels adapted primarily for mining cars and the like.

In my prior Patent, No. 1,109,906, dated Sept. 8, 1914, there is illustrated, described, and claimed a wheel construction which has proven highly satisfactory in use, and it is the primary object of the present invention to provide in a wheel construction of the type disclosed in said prior patent, certain modifications in the construction and arrangement of certain of the wheel parts.

More particularly, the invention has reference to novel and improved means to receive the end thrust of the wheels in opposite directions, the parts being constructed and arranged whereby to withstand undue strains without breakage of parts.

In carrying out the invention, there is provided a hub with an opening in the cap thereof, a tubular member sleeved upon the axle, which latter projects through the cap opening, means of improved construction for resisting the end thrust of the hub in one direction, and means on said tubular member overlying the inner surface of the hub cap for resisting end thrust in an opposite direction.

In the patented construction heretofore referred to, the tubular member sleeved upon the axle was open at its outer end, a pin being employed for securing the tubular member to the axle, and said pin overlying the outer surface of the hub cap. In order to overcome the possibility of shearing wear on the retaining pin referred to, it is contemplated by the present invention, to provide a closed end for the tubular member, said closed end overlying and adapted to contact with the end of the axle and when secured in place by the retaining pin the contact of the axle with the closed end of the tubular member will relieve the pin of damage or breakage due to side thrust of the wheel in action.

The improvements and novel details in the construction and arrangement of the various parts will be understood from the description to follow when considered in connection with the accompanying drawings, in which:—

Figure 1 is a longitudinal section of a wheel with my improvements applied. Fig. 2 is an elevation of the axle and parts connected therewith, removed from the wheel proper.

Like reference numerals refer to corresponding parts throughout the several views, wherein 1 is a pedestal member or support enlarged at 2 whereby to form a receiving pocket 3 for the hub of the wheel.

4 is a wheel having a suitable hollow hub 5, the inner end of which is extended and adapted to be positioned within the chamber or pocket 3 of the pedestal. The hub is open at its outer end whereby to receive a projecting end 6 of the axle 7. The projecting end 6 of the axle is of reduced diameter relative to the body portion thereof whereby to provide a shoulder part 8. End thrust receiving means in the embodiment of the invention illustrated herein preferably takes the form of a tubular member 9 fitted upon the axle portion 6 and having at its inner end a peripheral flange 10 overlying the inner surface of the hub cap. Said flange 10 has a reduced portion forming an annular shoulder 11 adapted to form a bearing for one end of anti-friction rollers 12 interposed between the axle and inner surface of the hub 5. A suitable angle bar or plate 13 secured at 14 in any desired manner to the hub forms a bearing for the opposite end of said rollers 12. A suitable bearing plate 15 and roller washer bearing 16 may be interposed between the inner surface of the hub cap and the flange 10 of the tubular member 9. The tubular member is closed at its outer end, preferably through the medium of an integral cap member 10 which latter is adapted to engage the end of the axle and to be secured in place as by a removable pin 17 projecting through the tubular member and axle. A washer 18 may be interposed between the securing pin and outer surface of the hub cap.

The construction and operation of the device will be appreciated from the above description when considered in connection with the drawings.

It will be understood that the hub of the wheel is spaced at its inner end from the pedestal member, thus obviating frictional contact at this point. As distinguished from that embodiment of my invention illustrated in my former patent above referred to the end thrust of the wheel in one direction is taken care of by the contact of the end of the axle with the closed end 10 of the tubular member, and this prevents undue wear upon the pin which in the structure of the former patent, constituted an abutment member for resisting end thrust in one direction. Any likelihood of damage to or breakage of the pin is thereby overcome, and at the same time a very substantial end thrust bearing is provided.

What I claim is:—

1. In a wheel construction, the combination of a pedestal member, a wheel having a hub, an axle projecting from the pedestal through the hub, a tubular member interposed between the axle and hub and projecting through the latter, said tubular member having an abutment at its outer end engaging over the end of the axle.

2. In a wheel construction, the combination of a pedestal member, a wheel having a hub, an axle projecting from the pedestal through the hub, a tubular member interposed between the axle and hub and projecting through the latter, said tubular member having an abutment at its outer end engaging over the end of the axle, and means for securing the tubular member to the axle.

3. In a wheel construction, the combination of an axle, a wheel having a hub mounted on the axle, the hub having an opening in the cap part thereof through which the axle projects, a tubular member interposed between the axle and the wall surrounding the hub cap opening, said tubular member having a closed end overlying the end of the axle, and constituting an abutment therefor, and means for securing the tubular member to the axle.

4. In a wheel construction, the combination of a wheel having a hub with an opening in the cap portion thereof, an axle projecting through the hub and through said cap opening, a tubular member interposed between the axle and the wall surrounding the hub cap opening, said tubular member having an abutment part overlying the inner surface of the hub cap and an abutment part overlying the outer end of the axle.

5. In a wheel construction, the combination of a wheel having a hub with an opening in the cap portion thereof, an axle projecting through the hub and through said cap opening, a tubular member interposed between the axle and the wall surrounding the hub cap opening, said tubular member having an abutment part overlying the inner surface of the hub cap and an abutment part overlying the outer end of the axle, and connecting means between the axle and tubular member.

6. In a wheel construction, the combination of a pedestal, a wheel having a hub part loosely positioned in the pedestal, an axle, the hub being loosely sleeved upon the axle for rotatable movement, said hub having a cap with an opening through which the axle projects, a sleeve interposed between the axle and wall of the opening in the hub cap, and means mounted on the sleeve for engaging the end of the axle to resist end thrust in one direction and means also mounted on the sleeve to engage over the inner surface of the hub cap to resist end thrust in an opposite direction.

7. In a wheel construction, the combination of a wheel and its hub, an axle upon which the wheel is loosely mounted for rotation, a tubular member positioned on the axle and secured thereto, the end of the hub being loosely sleeved upon said tubular member, said tubular member having a closed end to engage the end of the axle, and also having an annular part of relatively larger diameter adapted to overlie the inner surface of the outer end of the hub.

8. In a device of the character described, an axle, a tubular member sleeved upon the axle and secured thereto, said tubular member having a closed end adapted to engage the end of the axle and said tubular member having an outwardly projecting annular flange at a point spaced from the closed end thereof.

9. In a device of the character described, an axle, a tubular member sleeved upon the axle and secured thereto, said tubular member having a closed end adapted to engage the end of the axle and said tubular member having an outwardly projecting annular flange at a point spaced from the closed end thereof, and an anti-friction bearing member loosely sleeved upon the tubular member and adapted to contact the said annular flange.

10. In a device of the character described, the combination of a wheel having a hub, an axle projecting through the hub, an end or cap portion for the hub having an opening for said axle, a tubular member projecting through said opening and sleeved upon the axle, said tubular member having an outwardly projecting annular flange overlying said cap portion and also having a closed end overlying the end of the axle, a securing pin projecting through the tubular member and axle at a point outside of said cap portion, and a bearing member interposed between the flange of the tubular member and inner surface of the cap portion of the hub.

ALFRED BRYANT DAY.

Attest:
A. A. SCHMID,
WAYNE ECKEL.